No. 745,398. PATENTED DEC. 1, 1903.
P. SOMMER.
SLICING MACHINE.
APPLICATION FILED NOV. 21, 1902.
NO MODEL.
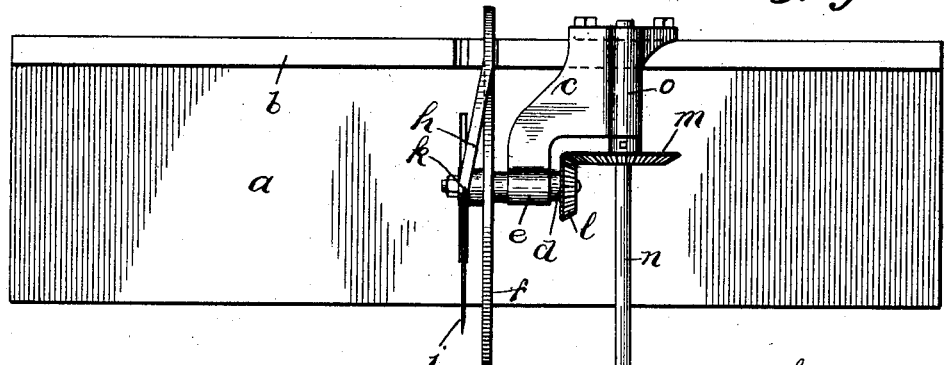
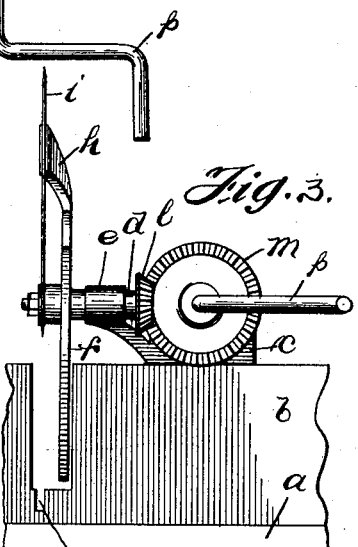
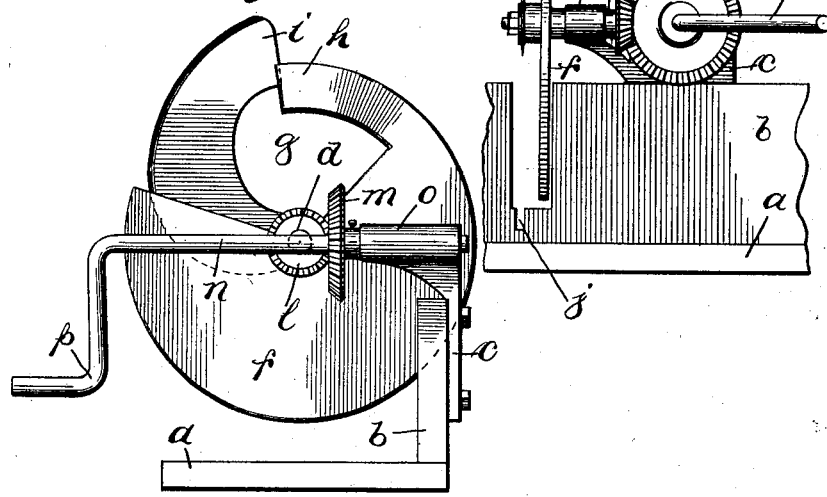
Witnesses: Inventor:
Philip Sommer,
by Bond Adams Pickard Jackson
Attys.

No. 745,398. Patented December 1, 1903.

UNITED STATES PATENT OFFICE.

PHILIP SOMMER, OF CHICAGO, ILLINOIS, ASSIGNOR, BY MESNE ASSIGNMENTS, TO ORR & LOCKET HARDWARE COMPANY, OF CHICAGO, ILLINOIS, A CORPORATION OF ILLINOIS.

SLICING-MACHINE.

SPECIFICATION forming part of Letters Patent No. 745,398, dated December 1, 1903.

Application filed November 21, 1902. Serial No. 132,227. (No model.)

*To all whom it may concern:*

Be it known that I, PHILIP SOMMER, a citizen of the United States, residing at Chicago, in the county of Cook and State of Illinois, have invented certain new and useful Improvements in Slicing-Machines, of which the following is a specification, reference being had to the accompanying drawings.

This invention relates to slicing-machines designed, primarily, for slicing loaves of bread, and has for its object the production of a machine for the purpose specified that will be simple in construction, that will cut slices of uniform width from the loaf, and that will immediately after cutting off a slice push such slice away from the knife and the rotating gage that turns with the knife, pushing also along the base-board on which the bread rests such other slices as may have been just previously cut, so that when all the slices desired have been cut from the loaf they will lie closely together in an even compact mass that can be readily handled. I attain this object by the devices and combinations of devices shown in the drawings and hereinafter fully described.

That which I regard as new will be set forth in the claims.

In the accompanying drawings, Figure 1 is a plan view. Fig. 2 is a rear elevation; and Fig. 3 is a side elevation, partly broken away.

Referring to said drawings, $a$ indicates a base which may, if desired, be provided with a vertical side piece $b$ to form a guide for the loaf being operated upon, the base $a$ being of a width to accommodate a loaf of bread of ordinary size.

$c$ indicates a support secured in the construction shown to the vertical side piece $b$.

$d$ indicates a shaft supported in a suitable bearing $e$, formed with or secured to the support $c$, such shaft extending longitudinally of and over the base $a$ and carrying at one end a disk or plate $f$, which may, if desired, be cast integral with the shaft $d$. As shown, this disk or plate $f$ has a notch $g$ of considerable size, from one side of which notch projects an extension $h$, the outer edge of which forms a continuation of the curved edge of said disk or plate $f$, which extension is, as shown, also curved outward, so as to project beyond the plane of the forward face of the disk or plate.

$i$ indicates a curved cutting-knife secured in the construction shown at one end to the forward end of the shaft $d$ and separated from the disk or plate $f$ by a suitable washer, such separation corresponding to the thickness that it is desired to have the slices of bread.

$j$ indicates a transverse groove in the face of the base $a$ to receive the edge of the knife, so as to insure the complete separation of slices from a loaf.

$k$ indicates a narrow groove in the projecting end of the extension $h$, into which the outer end of the knife $i$ is inserted. By this construction I provide means for rigidly holding the knife at both its ends and am consequently enabled to use a very thin blade for the knife without danger of its bending or breaking, which would be apt to occur in some cases if a very thin blade were employed that was unsupported at its outer end.

$l$ indicates a beveled gear secured to one end of the shaft $d$. $m$ indicates another beveled gear secured to a shaft $n$, mounted in a suitable bearing $o$ and meshing with the first-named gear, so that upon the rotation of the gear $m$ the shaft $d$ and the plate or disk $f$ and knife $i$, carried thereby, will be rotated.

$p$ indicates a crank formed on the end of the shaft $n$, by means of which the gear $m$ secured on such shaft can be rotated.

In operation a loaf of bread placed on the base $a$ forward of the disk or plate $f$ and knife $i$ is to be moved by hand against said disk or plate, while at the same time the movable parts of the machine are operated. The knife, coming in contact with the loaf, will cut off a slice, and the extension $h$ following in between such slice and the body of the loaf from which it was cut will by reason of its curvature away from the plane of the outer face of the disk or plate act to force such slice in rear of such disk or plate. The loaf of bread being continually pushed forward by hand against such disk or plate, other slices will be similarly cut off and in the same manner pushed behind the disk or plate, the rearward motion of each slice acting to push back the previously-cut slices, so that when the desired number of slices have been cut such slices will be found evenly and compactly arranged on the base $a$, so as to be easily removed therefrom. It is evident that the disk or plate $f$ acts as a gage by which the thickness of the slices is regulated and that the slices must be uniform as regards thickness.

That which I claim as my invention, and desire to secure by Letters Patent, is—

1. The combination with a shaft, and means for supporting and rotating the same, of a plate or disk carried thereby and having a notch therein, a curved and forwardly-inclined projection extending from one edge of said notch, and a rotatable knife mounted on said shaft and located forward of said disk or plate in substantially the same vertical plane as the forward end of said projection and connected at its outer end with said projection, substantially as specified.

2. The combination with a shaft, and means for supporting and rotating the same, of a plate or disk carried thereby and having a notch therein, a curved and forwardly-inclined projection extending from one edge of said notch and having a groove in its forward edge, and a knife also carried by said shaft so as to rotate therewith, located in front of and away from said disk or plate, and having its outer end inserted in the groove in the end of said projection, substantially as specified.

3. The combination with a shaft, and means for supporting and rotating the same, of a plate or disk carried thereby, a forwardly-inclined projection extending from said plate or disk, and a rotatable knife mounted on said shaft and located forward of said disk or plate in substantially the same vertical plane as the forward end of said projection, substantially as specified.

PHILIP SOMMER.

Witnesses:
ESTELLE WERNER,
SAMUEL ANDALMAN.